United States Patent [19]

Dahlquist et al.

[11] Patent Number: 4,690,012
[45] Date of Patent: Sep. 1, 1987

[54] ROBOT WRIST

[75] Inventors: Håkan Dahlquist; Herbert Kaufmann, both of Västerås, Sweden

[73] Assignee: ASEA Aktiebolag, Västerås, Sweden

[21] Appl. No.: 859,239

[22] Filed: May 7, 1986

Related U.S. Application Data

[63] Continuation of Ser. No. 645,686, Aug. 30, 1984, abandoned.

[30] Foreign Application Priority Data

Sep. 1, 1983 [SE] Sweden ................. 8304726

[51] Int. Cl.[4] .............................................. G25J 17/02
[52] U.S. Cl. ........................................ 74/479; 74/417; 901/26; 901/29
[58] Field of Search ............... 414/735; 901/14, 15, 901/26, 28, 29, 38; 74/665 C, 417, 479

[56] References Cited

U.S. PATENT DOCUMENTS 3,043,448 7/1962 Melton ........................... 901/14 X
3,247,978 4/1966 Neumeier ....................... 414/735
3,922,930 12/1975 Fletcher et al. ................. 901/29 X
4,068,536 1/1978 Stackhouse ..................... 74/417
4,402,234 9/1983 Malarz et al. ................... 901/29 X

FOREIGN PATENT DOCUMENTS 2927485 1/1981 Fed. Rep. of Germany ........ 901/28

Primary Examiner—Robert J. Spar
Assistant Examiner—Donald W. Underwood
Attorney, Agent, or Firm—Watson, Cole, Grindle & Watson

[57] ABSTRACT

A wrist for an industrial robot with a large orientation capacity comprising first, second, third and fourth turnable wrist parts arranged in series with each other. The first wrist part is rotatable about a first axis. The second wrist part is journalled in the first wrist part and is rotatable about a second axis which intersects the first axis. The third wrist part is journalled in the second wrist part and is rotatable about a third axis which intersects the second axis. A tool attachment is rotatably journalled in the third wrist part about a fourth axis which intersects the third axis.

8 Claims, 5 Drawing Figures

ROBOT WRIST

This application is a continuation of application Ser. No. 645,686, filed Aug. 30, 1984, now abandoned.

BACKGROUND OF THE INVENTION

This invention relates to a robot wrist and to a robot provided with a robot wrist. In particular, the invention is concerned with a robot wrist having a high orientation capacity, $\theta$. (In this connection the term "orientation capacity" refers to that ratio of the surface area of a sphere of given radius, centered on the point of articulation of the wrist, to the surface area of the spherical or part spherical surface of the same radius which can be reached by a member articulated by the wrist. Thus the orientation capacity $\theta$ ranges from 0 to 1, a high value for $\theta$, e.g. $\theta=0.8$, indicating that the wrist has a high degree of orientation about its point of articulation).

For operations such as arc welding, glueing, puttying, burring, and so on, involving the use of industrial robots operable within confined spaces, e.g., inside box-shaped objects such as the insides of car bodies, heavy demands are placed on the industrial robots used. In order to perform such operations the robot should have at least six axes of movement to enable a tool carried by the robot to be positioned, aligned and adjusted at any desired location within its operating range. Three such axes are normally provided in the robot itself and the other three axes provided in the robot wrist.

The robot arm and the robot wrist should also be hollow to accommodate a channel for cables and other wires in the robot arm and robot wrist. This channel should have a large radius of curvature and be otherwise so shaped as not to damage the cables and wire during operation of the robot, for example when the robot has a bent wrist.

To move a tool or a welding tip with a constant angle towards a working surface in a box, an orientation capacity of $\theta=0.8$ is required. This means that the wrist should be capable of being deflected at least 135° from the central axis of the robot arm carrying the wrist and be capable of adopting any angular position around the central axis of the robot arm.

The present invention aims to provide a robot wrist with a large orientation capacity and with three axes of movement.

A further aim of the invention is to provide a channel through the wrist for the passage of wires, cables or conduits for operating a tool carried by the wrist.

SUMMARY OF THE INVENTION

According to the invention, the wrist is formed with a plurality of rotatable parts arranged in series with each other, these parts each being rotatable around a different axis. A first wrist part is rotatable around a firt axis. A second wrist part is journalled in the first wrist part and is rotatable around a second axis which intersects the first axis. A third wrist part is journalled in the second wrist part and is rotatable around a third axis intersecting the second axis. In a third part of the wrist a tool attachment is rotatably arranged around a fourth axis intersecting the third axis of the robot arm.

Conveniently, the first and third wrist parts are provided with gear pinions for interconnecting the parts. These gear pinions may cooperate directly with each other, or possibly cooperate with intermediate gear pinions.

Suitably the second wrist part is connected to drive means via a drive shaft in the robot arm and bevel gear pinions on the drive shaft and on the second wrist part. The tool attachment means in the third wrist part is suitably connected to drive means in the robot via a drive shaft in the robot arm and an intermediate gear unit with a number of gear pinions, arranged in series, in the second wrist part. These gear pinions are suitably annular, thus obtaining a through-going opening or channel in the wrist, in which cables and other wires may be extended to a tool, for example a welding tool. It is also possible to arrange a drive motor for the tool attachment in the wrist.

BRIEF DESCRIPTION OF THE DRAWINGS

Embodiments of the invention will now be described by way of example, with reference to the accompanying drawings, in which.

DESCRIPTION OF THE PREFERRED EMBODIMENTS

Figure 1:
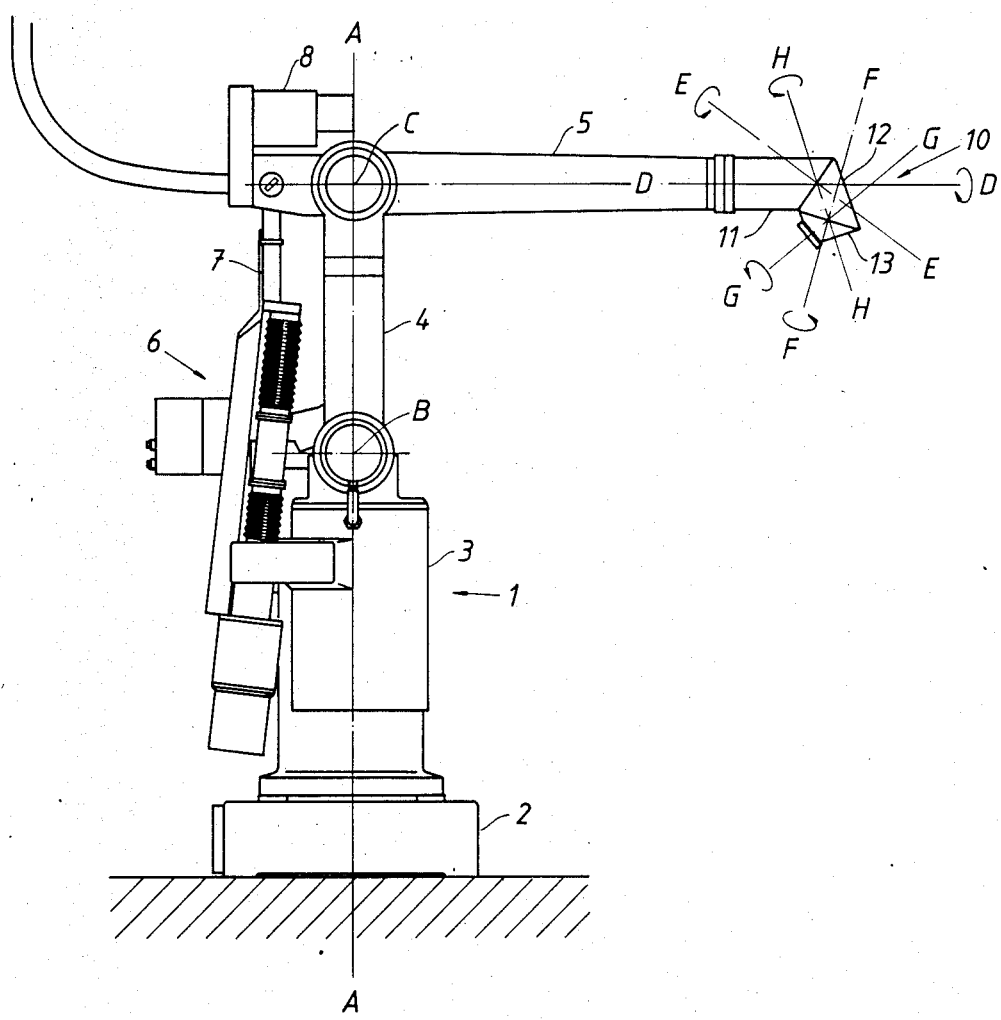
FIG. 1 is a side view of a computer-controlled industrial robot provided with a wrist according to the invention.

In FIG. 1, reference numeral 1 designates an industrial robot having six axes, three of which are in the robot itself and three in the wrist of the robot. The robot 1 comprises a base plate 2 on which is mounted a column 3 journalled for rotation about an axis A—A. A first arm 4 is mounted on the column 3 for rotary movement about an axis B and, at the end or upper part of this first arm 4, a second arm 5 is rotatably journalled for angular movement about an axis C. The column 3 is operated by drive means (not shown), the arm 4 is operated by a drive device 6 and the arm 5 is operated by a drive device 7, the main part of which is concealed by the drive device 6. A drive device 8 is mounted on one end of the arm 5 for driving a wrist 10 provided at the free end of the arm 5.

Figure 2:
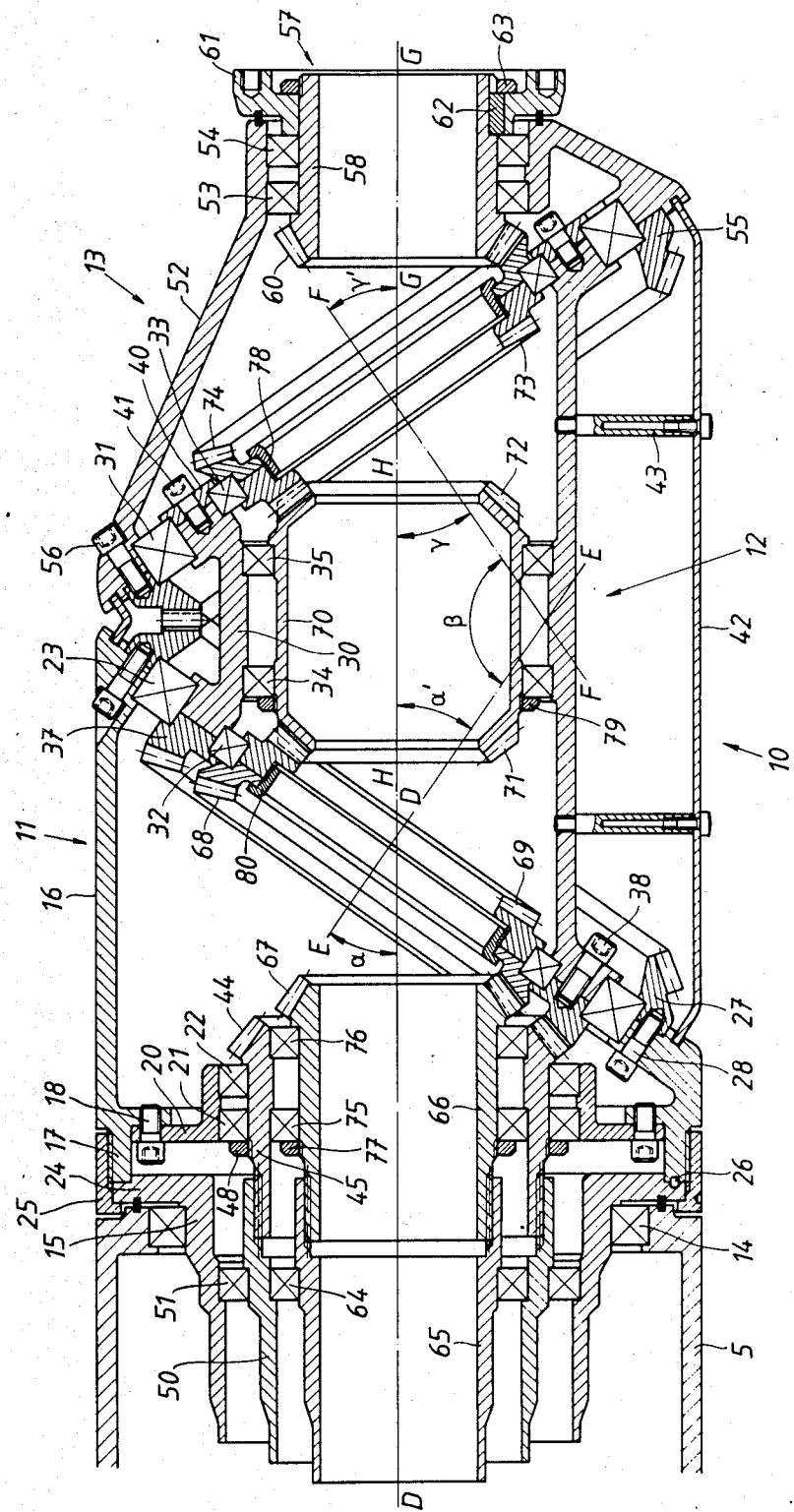
FIGS. 2 and 3 are sectional views of a wrist according to the invention with an extreme axis of the wrist oriented so as to coincide with the axis of the outer arm of the robot and making a maximum angle with this axis, respectively.
Figure 3:
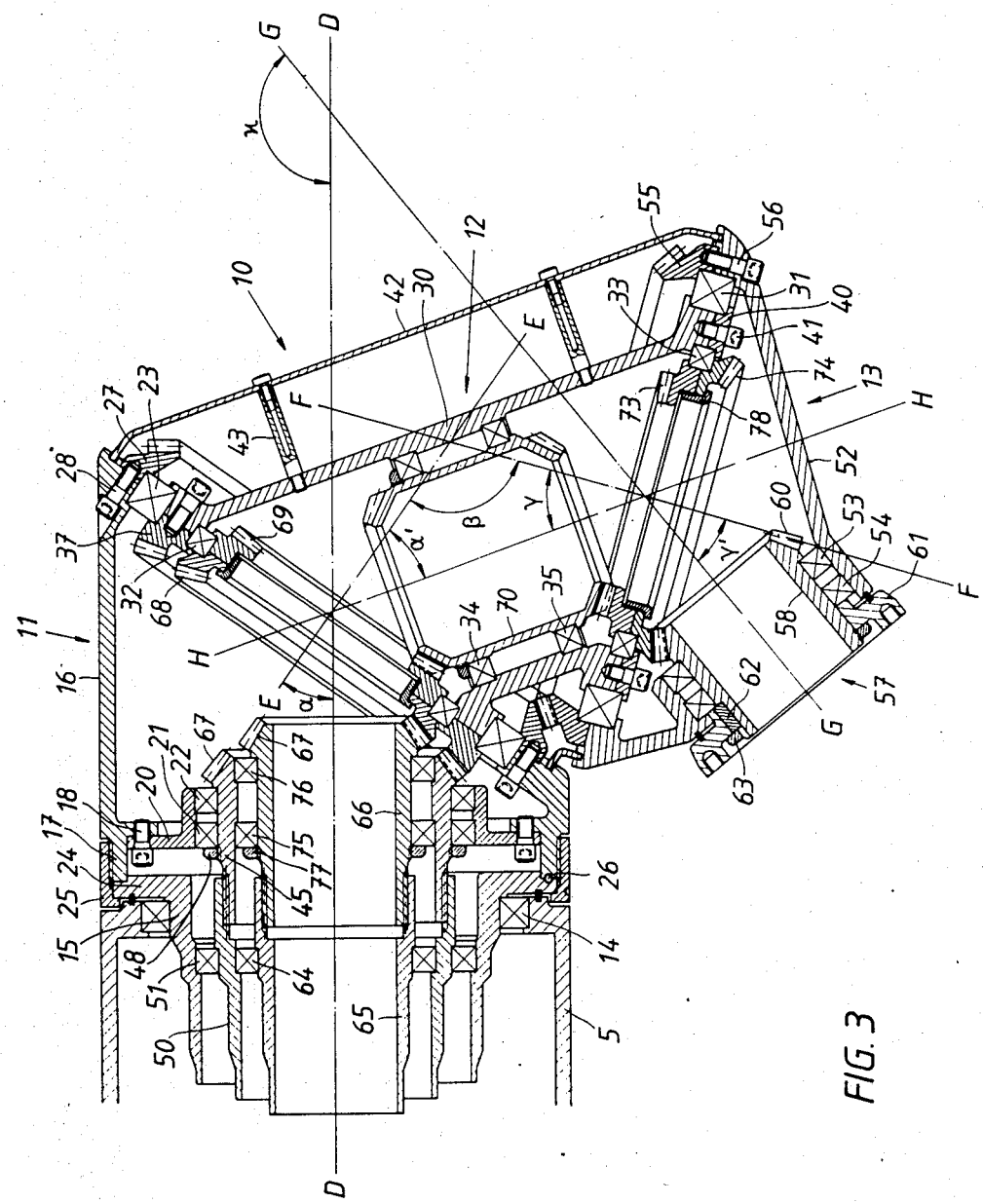

As can be seen in FIGS. 2 and 3, the wrist 10 comprises first, second and third parts 11, 12 and 13, respectively, arranged one after the other and rotatable or turnable with respect to each other. The first wrist part 11 is rotatable around an axis D—D, the second part 12 is rotatable around an axis E—E, and the third part 13 is rotatable around an axis F—F. The whole wrist 10 constitutes a readily replaceable unit since the first wrist part 11 is formed so as to be connectible to a tubular drive shaft 15 journalled in a bearing 14 in the robot arm 5.

The wrist part 11 comprises a tubular sleeve 16 having one end which is cut-off perpendicular to the axis D—D and which is formed with a threaded flange 17 and another end which is obliquely cut-off perpendicular to the axis E—E and which is formed with a seat for a bearing 23. A ring 20 is joined to the sleeve 16 by bolts 18 and forms the seat for bearings 21 and 22. The wrist 10 is joined to the drive shaft 15 by means of the threaded flange 17 and a threaded ring 25, applied on the flange 24 of the drive shaft, and a locking pin 26 for fixing the parts in mutually correct angular positions. An annular bevel gear pinion 27 is joined to the obliquely cut-off end of the sleeve 16 by means of bolts 28 and forms a fixing ring for a bearing 23.

The second wrist part 12 comprises a tubular sleeve 30 which is cut off obliquely at both its ends. The sleeve 30 is formed with seats for the bearing 23, a corresponding bearing 31 and the bearings 32, 33, 34, 35. Mounted on the sleeve 30 are an annular bevel gear pinion 37, which is joined to the tube sleeve 30 by means of bolts 38 and forms a fixing ring for the bearings 23 and 32, a ring 40 which is joined to the tubular sleeve 30 by bolts 41 and forms a fixing ring for bearings 31 and 33, and protection means 42 which is joined to the tube sleeve 30 by fastening devices 43. The bevel gear pinion 37 meshes with a bevel gear pinion 44 on a sleeve 45 which is journalled in the ring 20 by bearings 21 and 22 and axially fixed by the ring 48. The sleeve 45 is provided with external splines for interengagement with internal splines on a tube drive shaft 50. This drive shaft 50 is journalled in a bearing 51 inside the drive shaft 15.

The third part 13 of the wrist 10 comprises a part 52 of truncated cone form. The part 52 is obliquely cut off at its base where it provides a seat for the bearing 31 and is perpendicularly cut off at its top, in relation to an axis G—G, where it provides seats for bearings 53 and 54. An annular bevel gear pinion 55 is joined to the part 52 by means of bolts 56 and constitutes a fixing ring for bearing 31. The gear pinion 55 cooperates with the gear pinion 27 in the first wrist part 11 and thus connects the wrist parts 11 and 13 together. Upon rotation of wrist part 11 around the axis D—D, the wrist part 13 will rotate around the axis F—F.

A tool attachment 57 is mounted in the third wrist part 13 for rotation about the axis G—G. This attachment 57 includes a sleeve 58, which is journalled in bearings 53 and 54 and at its axially inner end is formed with a bevel gear pinion 60, and fixing ring 61, axially displaceable on the sleeve 58, for supporting a tool (not shown). A wedge 62 and a locking ring 63 are also provided for fixing the sleeve 58 in bearings 53, 54 and the fixing ring 61 on the sleeve 58.

The second wrist part 12 includes annular bevel gear pinions 68 and 69 which are mounted so as to be rotatably journalled within the bevel gear pinion 37 by means of the bearing 32 and annular bevel gear pinions 73 and 74 which are mounted so as to be rotatably journalled within the tubular sleeve 30 by means of the bearing 33. An externally threaded ring 78 retains the gear pinions 73 and 74 in position, the threaded part of the ring 78 cooperating with an internally threaded part of the annular gear pinion 73. An externally threaded ring 80 retains the gear pinions 68 and 69 in position, the threaded part of the ring 80 cooperating with an internally threaded part of the annular gear pinion 69. A sleeve 70 is rotatably mounted inside the tubular sleeve 30 by means of bearings 34 and 35, the sleeve 30 being prevented from axial movement by a locking ring 79. The sleeve 30 has bevel gear pinions 71 and 72 formed at its opposite axial ends, the pinion 71 meshing with pinion 69 and the pinion 72 meshing with bevel gear pinion 73.

A shaft 65 is journalled in the drive shaft 50 by means of a bearing 64 and is provided with internal splines which key with external splines provided on a sleeve 66. The sleeve 66 is journalled in the sleeve 45 by bearings 75 and 76 and axially fixed by the threaded ring 77. the sleeve 66 has a bevel gear pinion 67 thereon which meshes with the gear pinion 68. Drive from the shaft 65 is thus transmitted directly to the sleeve 66 and from the gear pinion 67 on the latter to the gear pinion 68. Drive is transmitted from the gear pinion 68 to the gear pinion 69 which rotates with the gear pinion 68. Drive is then transmitted to the sleeve 70 by virtue of the meshing gear pinions 69 and 71 and from the sleeve 70 to the gear pinions 73 and 74 by virtue of the gear pinion 72 meshing with the gear pinion 73. Finally, drive is transmitted to the tool attachment 57 by meshing of the pinion 74 with the bevel gear pinion 60.

In the position of the wrist parts shown in FIG. 2, the wrist axes D—D and G'G and a center axis H—H of the wrist part 12 coincide. The angles $\gamma$ and $\gamma$ between axes D—D and E—E and between axes E—E and H—H, respectively, are the same and the angles $\alpha$ and $\alpha$ between axes H—H and F—F and between axes F—F and G—G, respectively, are also the same. Thus $\alpha = \alpha' = \gamma = \gamma'$. angle $\beta$ between axes E—E and F—F becomes $180 - (\alpha + \gamma)$. However since $\alpha = \gamma$, $\beta = 180 - 2\alpha$. With regard to FIG. 3, with $\alpha = \alpha' = \gamma = \gamma' = 35°$, $\eta$, the angle between axes D—D and G—G becomes equal to 140°, which provides the wrist extremely good accessibility which is very valuable, particularly when welding inside box-shaped structures.

The size of the angles mentioned above results in a very practical wrist with a versatile field of use, but the size of the angles may be selected within wide limits and may be different from those referred to above.

It is possible to drive the tool attachment 57 by means of a separate drive motor positioned in the wrist 10. This drive motor may be applied, for example, in the second or third wrist part, 12 or 13. The drive shaft 65 and the transmission shown between the shaft 65 and the tool attachment 57 are then omitted, which results in a significant simplification of the design of the wrist. It is also possible to replace the gear pinion 74 with a tool attachment. Further, it is possible, for simpler applications, to utilize the conical sleeve 52 of the third wrist part 13 as a tool attachment. Also in that case, the drive shaft 65 and the subsequently positioned transmission are eliminated.

As will be clear from the description and the drawings, the wrist is hollow so that cables and protective gas conduits and wires for tools, for example a welding bar, can be passed through the robot arm and further through the wrist to a working station. A particular advantage with the wrist according to the invention is that the channel, formed by the openings through the annular gear pinions 68, 69, 71, 72, 73, 74 when bending the wrist, has a relatively great radius of curvature. This radius of curvature is greater than at the corresponding channels in prior art wrists. The diameter of the channel is great in relation to the outer diameter of the wrist. Another important advantage is that, during rotation of the tool, the tubular shaft 65 and all the elements surrounding a cable assembly through the shaft 65 and in the robot wrist rotate in the same direction. Twisting of the cable assembly is eliminated and the wear is insignificant. The shape of the wrist 10 also means that the bending moment is absorbed in a favourable manner by bearings and gear pinions. The wrist has great rigidity and can be positioned with great precision.

Figure 4:
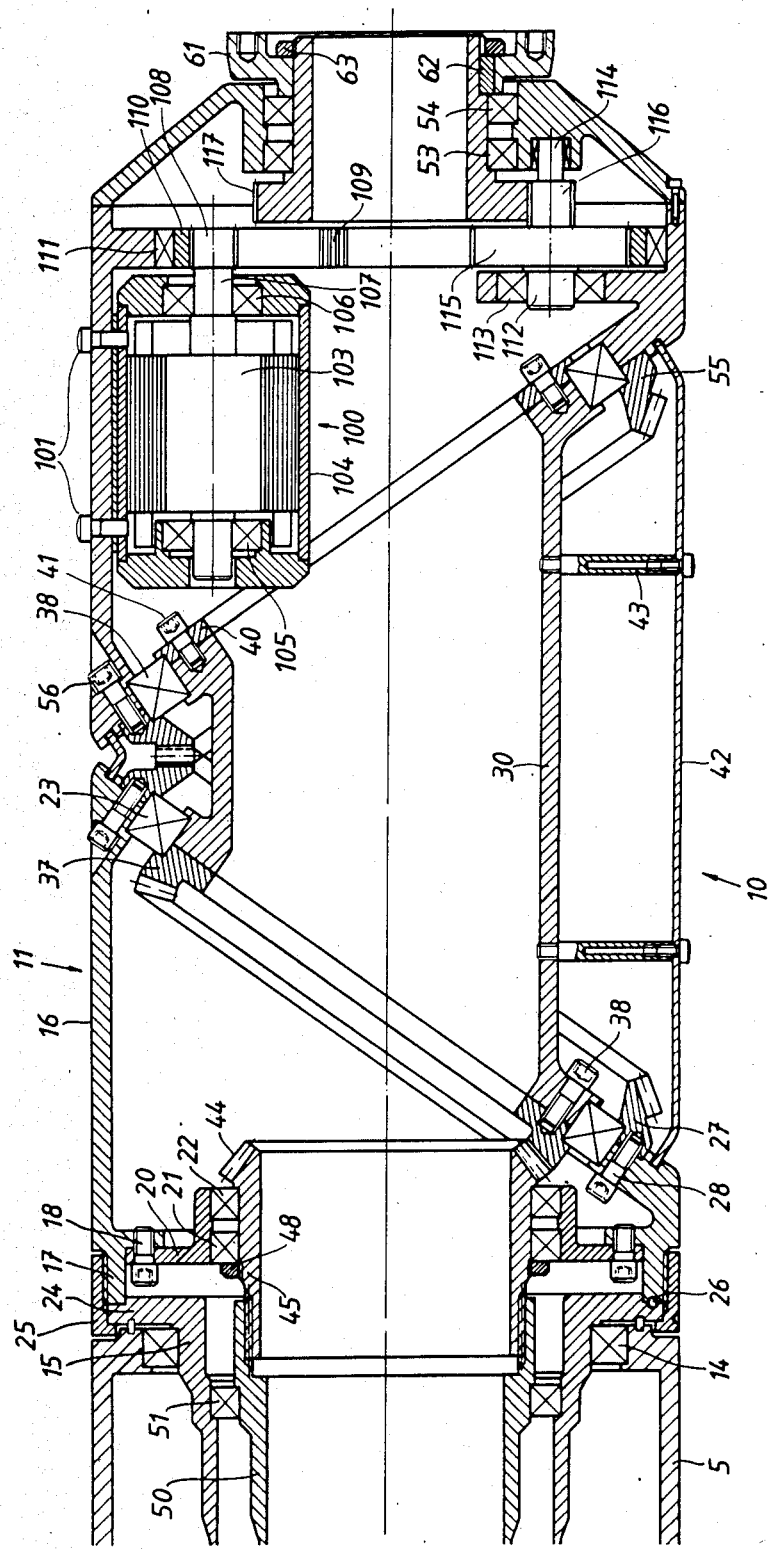
FIGS. 4 and 5 are sectional views of a wrist having a driving motor inside the wrist for the rotary movement of the tool carrier means.

In the alternative embodiment of FIG. 4, the rotary movement of the sleeve 58 of the attachment 57 is achieved by means of a motor 100, preferably an electric motor, in the wrist part 52 of the wrist 10. The motor 100 is secured to the wrist part 52 by means of bolts 101. The rotor 103 is journalled in the motor housing 104 by bearings 105 and 106. The shaft 107 carries a gear pinion 108. This pinion 108 is in mesh with the internal gear 109 of the ring 110 journalled in the housing 52 by a bearing 111. A shaft 112 is journalled in the housing 52 by bearings 113 and 114 and carries intermediate gear wheels 115 and 116 in mesh with the gear ring 110 and the gear 117 of the sleeve 58.

Figure 5:
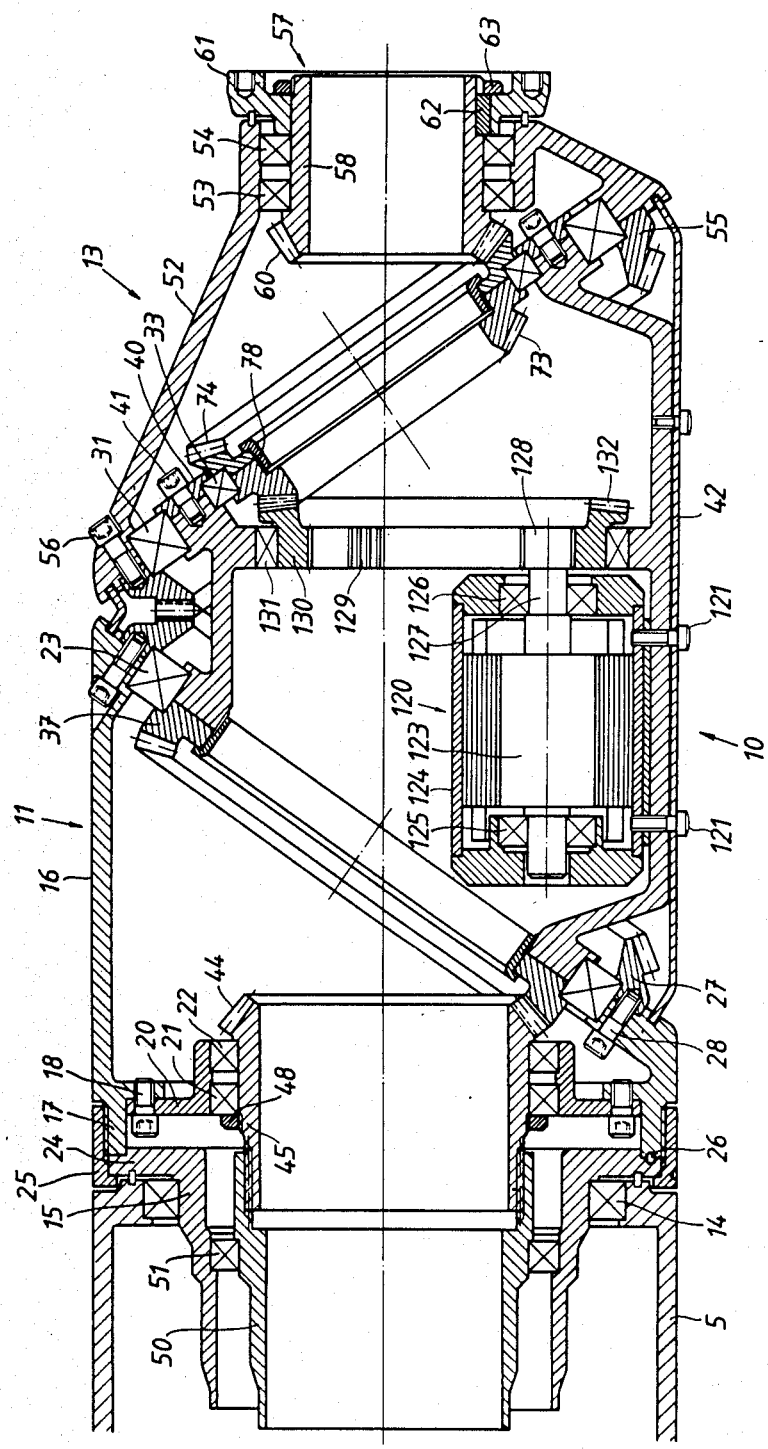

In the alternative embodiment of FIG. 5, the rotary movement of the sleeve 58 of the attachment member 57 is achieved by means of a motor 120 in the sleeve 30 of the second wrist part 12. The motor 120 is secured to the sleeve 30 by means of bolts 121. The rotor 123 is journalled in the motor housing 124 by bearings 125 and 126. The shaft 127 carries a gear pinion 128. This pinion 128 is in mesh with the internal gear 129 of the ring 130, journalled in the sleeve 30 by means of a bearing 131. The ring 130 is also provided with a bevel gear 132 in mesh with the annular gear pinion 73.

What is claimed is:

1. A wrist mechanism which can be attached to the arm of a robot and which can support a working tool, said wrist mechanism comprising a first tubular wrist part which defines a first central axis therethrough and which has a first end and a second end, said first end being mountable on said robot arm so as to be rotatable about said first central axis and said second end having an oblique orientation relative to said first central axis, said first central axis defining a first rotation axis of said wrist mechanism, a second tubular wrist part which defines a second central axis therethrough and which has a first end and a second end, each of said first and second ends having an oblique orientation relative to said second central axis, first journal means for mounting the first end of said second tubular wrist part to the second end of said first tubular wrist part and to enable said second tubular wrist part to rotate relative to said first tubular wrist part about a second rotation axis which intersects said first central axis, a third tubular wrist part which defines a third central axis therethrough and which has a first end and a second end, said first end having an oblique orientation relative to said third central axis, second journal means for mounting the first end of said third tubular wrist part to the second end of said second tubular wrist part and to enable said third tubular wrist part to rotate relative to said second tubular wrist part about a third rotation axis which intersects said third central axis, bevel gear means interconnecting the second end of said first tubular wrist part with the first end of said third tubular wrist part so as to cause coordinated rotation therebetween, a tool attachment means, and a third journal means for mounting said tool attachment means on the second end of said third tubular wrist part and to enable said tool attachment means to rotate relative to said third journal means about a fourth rotation axis which intersects said third rotation axis, said first, second and third tubular wrist parts allowing a cable to be extended therethrough.

2. The wrist mechanism according to claim 1, wherein the robot arm to which said wrist mechanism is attachable includes first and second drive means, wherein the first end of said first tubular wrist part is connectable to said first drive means such that said first drive means can cause said first tubular wrist part to rotate about said first rotation axis, and wherein the first end of said second tubular wrist part includes a first gear wheel means which is engageable with said second drive means such that said second drive means can cause said second tubular wrist part to rotate about said second rotation axis.

3. The wrist mechanism according to claim 2, wherein said first gear wheel means comprises an annular bevel gear pinion.

4. The wrist mechanism according to claim 3, wherein the robot arm to which said wrist mechanism is attachable includes a third drive means, wherein a second gear wheel means is rotatably journalled within said second tubular wrist part, and wherein said tool attachment means includes a third gear wheel means, said second gear wheel means being engaged with said third gear wheel means and engageable with said third drive means such that said third drive means can cause said second gear wheel means to rotate and said tool attachment means to rotate about said fourth rotation axis.

5. The wrist mechanism according to claim 4, wherein said second gear wheel means comprises a first pair of interconnected annular bevel gear pinons which are rotatably journalled within the first end of said second tubular wrist part, a second pair of interconnected annular bevel gear pinions which are rotatably journalled within the second end of said tubular wrist part, and a hollow sleeve rotatably journalled within said second tubular wrist part and engaged with both said first pair and said second pair of annular bevel gear pinions, said first pair of annular gear pinions being also engageable with said third drive means, and said second pair of annular gear pinions being also engaged with said third gear wheel means.

6. The wrist mechanism according to claim 5, wherein said third gear wheel means comprises an annular bevel gear pinion.

7. The wrist mechanism according to claim 3, including drive motor means mounted in said second tubular wrist part and connection means extending between said drive motor means and said tool attachment means to rotate said tool attachment means about said fourth rotation axis.

8. The wrist mechanism according to claim 3, including drive motor means mounted in said third tubular wrist part and connection means extending between said drive motor means and said tool attachment to rotate said tool attachment means about said fourth rotation axis.

* * * * *